United States Patent [19]

Ryan

[11] Patent Number: 4,504,589

[45] Date of Patent: Mar. 12, 1985

[54] HYDRODENITRIFICATION CATALYST AND A METHOD FOR IMPROVING THE ACTIVITY OF THE CATALYST

[75] Inventor: Robert C. Ryan, Houston, Tex.

[73] Assignee: Shell Oil Company, Houston, Tex.

[21] Appl. No.: 593,061

[22] Filed: Mar. 26, 1984

[51] Int. Cl.$^3$ .......................... B01J 23/85; B01J 23/88
[52] U.S. Cl. ..................................... 502/66; 502/254; 502/255; 502/305; 502/313; 502/314; 502/315; 502/321
[58] Field of Search ................. 502/66, 254, 255, 314, 502/315, 313, 305, 321; 208/254 H

[56] References Cited

U.S. PATENT DOCUMENTS 3,094,480  6/1963  Richardson ..................... 502/314 X
4,326,995  4/1982  Berg et al. ......................... 502/314

Primary Examiner—W. J. Shine
Attorney, Agent, or Firm—John M. Duncan

[57] ABSTRACT

Hydroconversion catalysts containing Group VIII and/or Group VIB catalytically active metals on a support, and particularly those containing nickel and molybdenum on alumina, are improved in hydrodenitrification (HDN) activity by impregnation of additional molybdenum and/or tungsten carbonyls onto the catalyst by sublimation. Preferably from about 1 to 5% w molybdenum is added. The carbonyl impregnated catalyst is then dried, calcined and, generally sulfided before use in a hydrocarbon conversion process.

20 Claims, No Drawings

HYDRODENITRIFICATION CATALYST AND A METHOD FOR IMPROVING THE ACTIVITY OF THE CATALYST

BACKGROUND OF THE INVENTION

This invention relates to a method for preparing a supported hydroconversion catalyst, particularly with respect to improved hydrodenitrification (HDN) activity.

Considerable research has been undertaken to develop and commercialize new, cost effective highly active hydroconversion catalysts for large volume first stage hydrocracking and catalytic cracking feed hydrotreater applications. The inclusion of significant amounts of 1000° F.+ residual components, including cracked stocks, in the hydrocarbon feed to these processes has created severe activity and stability problems for the catalysts currently used commercially in these applications. The growing demand for new catalysts for up-grading such poor quality feedstocks has led to the discovery of an improved catalyst by a special technique for adding additional catalytically active metals onto supported catalysts.

Methods for preparing supported hydrogenation metal catalysts which are suitable starting points for the instant invention are well known. For example, Adams, U.S. Pat. No. 3,629,146, which is incorporated herein by reference, relates to a method for preparing a supported catalyst containing high catalytic metal concentrations in a single aqueous impregnation from a stabilized solution. It is also known to combine molybdenum carbonyls with alumina to prepare a catalyst for the metathesis of olefins J. Mol. Catalysis, 1 (1975/76)77–84. Surprisingly, I have discovered that the hydrodenitrification activity of commercial hydrotreating catalysts can be greatly improved by adding small amounts of molybdenum and/or tungsten carbonyls to said catalysts by sublimation.

SUMMARY OF THE INVENTION

A method is provided for improving the hydrodenitrification activity of supported hydrotreating catalysts having catalytically active amounts of Group VIII and/or Group VIB metals incorporated into a support which comprises adding from about 0.5 to 15%w of molybdenum and/or tungsten carbonyls to said catalyst by sublimation and drying and calcining said metal carbonyl impregnated catalyst. The invention further relates to a supported hydrotreating catalyst with improved hydrodenitrification activity prepared in this manner.

DETAILED DESCRIPTION OF THE INVENTION

This invention is applicable to supported hydrotreating catalysts which contain Group VIII and/or Group VIB metals of the Periodic Table incorporated into a support. Typically such catalysts will contain from about 1 to 5%w nickel and/or cobalt as Group VIII metals and from about 5 to 15%w molybdenum or tungsten as the Group VIB metal.

Any of the usual catalyst supports are thought to be suitable for the invention. Suitable supports for the catalysts of the invention include refractory oxides, such as alumina, silica and mixtures thereof. Crystalline synthetic zeolites such as aluminosilicates, iron silicates, gallium silicates and mixtures thereof may also be used as supports, preferably in combination with refractory oxide supports. A particularly preferred support is gamma-alumina which contains less than 1%w silica.

Molybdenum and tungsten metal carbonyls are zero valence as far as the metals are concerned. Known metal carbonyls include $M(CO)_6$, $XM(CO)_3$ where X can be benzene, toluene, cycloheptatriene, etc., and all of these carbonyls should be equally suitable for the invention. However, not all metal carbonyls are equally effective. While molybdenum and tungsten carbonyls, added to a catalyst by the method of the invention, improve its HDN activity, chromium carbonyl, added by the same method, decreases the HDN activity. Thus my invention is limited to molybdenum and tungsten carbonyls.

Previous efforts at improving the HDN activity of catalysts by incorporating additional molybdenum as $MoO_3$ have been unsuccessful. It was hoped that the interaction of a metal in a low oxidation state with a catalytic metal on a support might produce a unique metal-metal interaction and possibly high dispersion of the added metal. Although the interaction of metal carbonyls with alumina, silica, and zeolite supports has recently been discussed in the literature [A. Brenner and D. A. Hucul, J. Am. Chem. Soc., 102, 2484 (1980)] the interaction of metals with metals on supports is novel.

Initial exploratory studies showed that sublimation of Mo and W carbonyls onto a commercial hydrotreating catalyst produced and sold by Shell Chemical Co. had a profound effect on catalytic activity. By adding about 1.5%w Mo to the catalyst, HDN activity was increased 16% relative to the base catalyst. From about 0.5%w up to about 15%w metal carbonyl may be added by the method of the invention with good results. However, it is preferred to add only from about 1%w to about 5%w by the method of the invention.

A substantial increase in the hydrodenitrification (HDN) activity, relative to commercial catalysts, is required to commercialize a new hydrotreating catalyst. In an effort to develop such an improved catalyst, many experimental catalysts were prepared and tested for HDN activity. The HDN activity test used in the testing program is designed to measure denitrification by using a standard set of conditions, including temperature, pressure, gas flow and liquid flow, for each catalyst. A standard commercial catalyst is tested under the same conditions as the experimental catalysts. The first order denitrification rate constant of the standard catalyst is defined as 1.00 and all experimental catalysts have activities measured relative to this standard. This method was used to determine the HDN improvement as shown in the Examples herein.

Suitable hydroconversion conditions for the processes using improved catalysts according to the present invention are as follows: a temperature of 350°–420° C.; a total pressure of 75–200 bar; a partial hydrogen pressure of 60–200 bar; a space velocity of 0.4–1.5 kg oil/l catalyst/hour; and a hydrogen feed rate of 250–2500 Nl/kg oil feed. The hydrodenitrification of heavy oil feeds according to the present process is preferably carried out under the following conditions: a temperature of 360°–410°; a total pressure of 100–150 bar; a partial hydrogen pressure of 80–150 bar; a space velocity of 0.4–1.0 kg oil/l catalyst/hour; and a hydrogen feed rate of 500–1500 Nl/kg oil feed.

The hydrogen applied can be pure hydrogen or a hydrogen-containing gas, preferably one comprising more than 70% of hydrogen. The hydrogen-containing gas may also contain up to about 10% of hydrogen sulfide.

It is preferred that the hydrocarbon oil feed stream contain less than 3 ppmw, and most preferably less than 1 ppmw of vanadium and nickel combined. In some cases it is necessary to subject the hydrocarbon oil to a demetallization pre-treatment in order to reach these levels.

The preferred catalysts used for the demetallization pre-treatment comprise 1–5%w of nickel and 5–15%w of molybdenum, both percentages based on total catalyst. The preferred molybdenum:nickel weight ratio lies between 3:1 and 6:1. These metals may be incorporated into the catalyst by any method known in the art, for example by impregnation of alumina in one or more stages with an aqueous solution containing one or more salts of the metals concerned. Suitable conditions for carrying out the demetallization pre-treatment are as follows: a temperature of 370°–420° C.; a total pressure of 65–220 bar; a partial hydrogen pressure of 60–200 bar; a space velocity of 0.2–2 kg oil/l catalyst/hour; and a hydrogen feed rate of 250–2500 Nl/kg oil.

The gas streams separated from both the pre-treated and the converted hydrocarbon oils, as well as from the residual fraction and the product obtained, can all be partially or completely recycled.

The invention will now be illustrated by the following examples:

EXAMPLE 1

Six catalyst samples were prepared using a commercial Ni/Mo/Al$_2$O$_3$ hydrotreating catalyst, as a starting material. The starting material was prepared by first drying a sample of the catalyst, which was a 1/16-inch diameter extrudate, at 480° C. for two hours and then cooling it under nitrogen for 30 minutes. A weighed amount of extrudate was then placed in a round-bottom flask with an appropriate amount of molybdenum, tungsten or chromium carbonyls, whereby a desired additional catalytic metal content was impregnated onto the commercial catalyst by sublimation. The extrudates were placed on a rotovap under 2 mm Hg pressure and heated for 75 minutes at 80° C. The finished catalyst samples were then obtained by drying and calcining in air at 480° C. for two hours. The percent weight increases in metal content of the catalyst samples after adding metals by sublimation are shown in Table 1. The metals added were assumed to be MoO$_3$, CrO$_3$ and WO$_3$ after calcining the catalyst.

Catalysts A and E were prepared by subliming metal hexacarbonyls onto a dried catalyst by using 50 grams of a first sample of commercial hydrotreating catalyst. Catalyst B was prepared by using 300 grams of a second sample of commercial hydrotreating catalyst. Catalysts C, D and F were prepared by using 50 grams of the second sample of the commercial hydrotreating catalyst.

These six "added metal" catalysts and the commercial hydrotreating catalyst were used to hydrotreat a sample of catalytically cracked heavy gas oil (CCHGO) having feed properties shown in Table 1. All the catalysts were sulfided before the hydrotreating tests began by treatment with a H$_2$/H$_2$S (5%v H$_2$S) gaseous mixture at elevated temperature (700° F.) for two hours.

Catalyst A, which contained approximately 1.5%w additional Mo, showed an increase in HDN activity of 16% relative to the first sample of commercial catalyst. Catalyst B, which contained 3.3%w additional Mo, and was prepared from a larger batch of a second sample of commercial catalyst, was roughly equivalent in HDN activity to the first commercial catalyst. Catalyst C, which was prepared in the same manner as Catalyst A, but had the same 3.3%w Mo content as Catalyst B, showed about a 12% increase in HDN activity over the commercial catalyst. Catalyst D, which was prepared similar to Catalyst A, was not calcined prior to sulfiding and testing. This catalyst showed an 8% increase in HDN activity as compared to the commercial catalyst.

Catalysts E and F were prepared starting with 50 gram samples of the second sample of commercial catalyst. Catalyst E, which contained chromium, was significantly less active for hydrogenation, hydrodenitrification and hydrodesulfurization than the commercial catalyst. Catalyst F, which contained tungsten, showed an increase of 9% in HDN activity over the commercial catalyst.

TABLE 1

CCHGO Test Results

Conditions: 850 psig, 625° F., H$_2$/Oil = 4.0,
Feed Properties: 88.99% C, 9.68% H, 1.28% S, 482 ppm N

| Catalyst | M(CO)$_6$ | wt % Increase of Catalyst | No. of Runs | Relative Activity | | |
|---|---|---|---|---|---|---|
| | | | | Hydrogenation | Hydrodenitrification | Hydrodesulfurization |
| Commercial | — | — | | 1.00 ± 0.03 | 1.00 ± 0.10 | 1.00 ± 0.10 |
| A | Mo | 1.5$^{(1)}$ | 3 | 1.04 | 1.16 | 1.12 |
| B | Mo | 3.3 | 1 | .99 | 1.01 | .95 |
| C | Mo | 3.3 | 1 | 1.05 | 1.12 | 1.12 |
| D | Mo | 1.5$^{(1)}$ | 1 | 1.01 | 1.08 | 1.00 |
| E | Cr | 2.7$^{(1)}$ | 1 | .92 | .83 | .83 |
| F | W | 2.7 | 1 | 1.00 | 1.09 | .95 |

$^{(1)}$Estimated.

What is claimed is:

1. A method for improving the hydrodenitrification activity of a hydroconversion catalyst which contains catalytically active amounts of Group VIII and/or Group VIB metals incorporated into a suitable support, which comprises adding from about 0.5 to 15%w of molybdenum and/or tungsten carbonyls to said catalyst by subliming said carbonyls onto said catalyst at elevated temperature; and drying and calcining said metal carbonyl impregnated catalyst for use in a hydroconversion process.

2. The method of claim 1 wherein from about 1 to 5%w metal carbonyl is added to said catalyst.

3. The method of claim 1 wherein the Group VIII metal incorporated into said support is nickel and/or cobalt and the Group VIB metal is molybdenum and/or tungsten.

4. The method of claim 3 wherein said support is selected from the group consisting of alumina, silica or mixtures thereof.

5. The method of claim 4 wherein said support includes a crystalline silicate zeolite.

6. The method of claim 4 wherein said carbonyl compound is a hexacarbonyl.

7. The method of claim 1 wherein said hydroconversion catalyst is dried before adding said carbonyl compound onto said catalyst at reduced pressure.

8. The method of claim 4 wherein a molybdenum carbonyl compound is impregnated onto said catalyst by sublimation at elevated temperature and reduced pressure.

9. The method of claim 1 wherein said metal carbonyl impregnated catalyst is sulfided before use in said hydroconversion process.

10. The method of claim 1 wherein said hydroconversion catalyst comprises nickel and molybdenum compounds supported on alumina and a molybdenum carbonyl compound is incorporated thereon by sublimation at elevated temperature and reduced pressure.

11. The method of claim 10 wherein the molybdenum carbonyl content added to the catalyst by sublimation is from about 1 to 5%w, basis catalyst.

12. A supported hydroconversion catalyst with improved hydrodenitrification activity which contains catalytically active amounts of Group VIII and/or Group VIB metals incorporated into a suitable support, and which catalyst composite has been dried and calcined after incorporating said metals into said support, the improvement which comprises impregnating the composite with from about 0.5% to 15%w of molybdenum and/or tungsten as metal carbonyls by sublimation at elevated temperature; drying and calcining said metal carbonyl impregnated catalyst.

13. The catalyst of claim 12 wherein said catalytically active Group VIII metal is nickel and/or cobalt and said Group VIB metal is molybdenum and/or tungsten.

14. The catalyst of claim 13 wherein the support is selected from the group consisting of alumina, silica and mixtures thereof.

15. The catalyst of claim 12 wherein said carbonyl compound is a hexacarbonyl.

16. The catalyst of claim 12 wherein said supported hydrotreating catalyst is dried and then impregnated by sublimation of from about 1 to 5%w of molybdenum and/or tungsten hexacarbonyl onto said catalyst at elevated temperature and reduced pressure.

17. The catalyst of claim 14 wherein said molybdenum and/or tungsten carbonyl compound is impregnated onto said catalyst by sublimation at elevated temperature and reduced pressure.

18. The catalyst of claim 12 wherein said metal carbonyl is converted to a sulfide before said catalyst is used in a hydroconversion process.

19. The catalyst of claim 12 wherein said hydroconversion catalyst comprises nickel and molybdenum compounds supported on alumina and a molybdenum hexacarbonyl compound is incorporated thereon by sublimation at elevated temperature and reduced pressure.

20. The catalyst of claim 19 wherein the molybdenum hexacarbonyl content added to the catalyst by sublimation is from about 1 to 5%w.

* * * * *